(12) United States Patent
Teo

(10) Patent No.: US 10,862,719 B1
(45) Date of Patent: Dec. 8, 2020

(54) METHOD AND APPARATUS FOR DETERMINING DATA OF ASK SIGNAL, AND WIRELESS POWER TRANSMITTER USING THE SAME

(71) Applicant: HANA MICROELECTRONICS PUBLIC CO., LTD., Bangkok (TH)

(72) Inventor: ChweeHeng Teo, Bangkok (TH)

(73) Assignee: HANA MICROELECTRONICS PUBLIC CO., LTD., Bangkok (TH)

( * ) Notice: Subject to any disclaimer, the term of this patent is extended or adjusted under 35 U.S.C. 154(b) by 0 days.

(21) Appl. No.: 16/818,216

(22) Filed: Mar. 13, 2020

(30) Foreign Application Priority Data

Nov. 5, 2019 (KR) .................. 10-2019-0140067

(51) Int. Cl.
H04L 27/06 (2006.01)
H04B 1/06 (2006.01)

(52) U.S. Cl.
CPC .............. H04L 27/06 (2013.01); H04B 1/06 (2013.01)

(58) Field of Classification Search
CPC .................................. H04L 27/06; H04B 1/06
See application file for complete search history.

(56) References Cited

U.S. PATENT DOCUMENTS

| 6,496,549 | B1* | 12/2002 | Crawford | H03D 1/18 |
| | | | | 327/18 |
| 2008/0026712 | A1* | 1/2008 | Leutgeb | H04L 25/061 |
| | | | | 455/130 |
| 2010/0020864 | A1* | 1/2010 | Matsuo | H04L 25/4902 |
| | | | | 375/239 |
| 2015/0256370 | A1* | 9/2015 | Lee | H04L 27/06 |
| | | | | 375/222 |
| 2018/0113160 | A1* | 4/2018 | Warburton | G01S 7/4866 |

FOREIGN PATENT DOCUMENTS

| JP | 2007252178 | 9/2007 |
| KR | 100990129 | 10/2010 |
| KR | 20170007756 | 1/2017 |
| KR | 20190079815 | 7/2019 |

* cited by examiner

Primary Examiner — Dac V Ha
(74) Attorney, Agent, or Firm — IPLA P.A.; James E. Bame

(57) ABSTRACT

A method and apparatus for determining an amplitude-shift keying (ASK) signal, and a wireless power transmitter using the same is provided. The method of determining data of the ASK signal includes receiving a demodulated signal of a received ASK signal, measuring a pulse time during which a pulse configuring the demodulated signal is held, storing the measured pulse time, and determining information on a current pulse based on a pulse time of the current pulse of the demodulated signal and a holding time of an immediately preceding pulse.

4 Claims, 2 Drawing Sheets

METHOD AND APPARATUS FOR DETERMINING DATA OF ASK SIGNAL, AND WIRELESS POWER TRANSMITTER USING THE SAME

CROSS REFERENCE

This application claims foreign priority under Paris Convention to Korean Patent Application No. 10-2019-0140067, filed 5 Nov. 2019, with the Korean Intellectual Property Office, which is incorporated herein by its entirety.

BACKGROUND

The present disclosure relates to a method and apparatus for determining an amplitude-shift keying (ASK) signal and a wireless power transmitter using the same, and more particularly, to a method and apparatus for determining an ASK signal and a wireless power transmitter using the same for determining information on a current pulse based on a holding time of a current pulse and a holding time of an immediately preceding pulse when an ASK signal is distorted after the received ASK signal is demodulated.

A demodulator of an amplitude-shift keying (ASK) signal basically includes an envelope detector, a low-pass filter, and a Schmitt trigger. However, when distortion is caused in an ASK signal for various reasons, for example, when a transmitter and a receiver of the ASK signal are positioned far from each other, the depth (voltage) of a pulse of a demodulated signal is reduced and the holding time of the pulse is increased or reduced due to noise. As such, in order to recognize the reduced depth, a comparator needs to be set to be sensitive, but in this case, noise is increased in an output signal.

Korean Patent No. 10-0990129 (Low-power ASK demodulator) discloses a highly integrated low-power ASK demodulator, but no method or configuration for increasing the recognition rate of the aforementioned ASK signal when distortion is caused in the ASK signal is disclosed.

In addition, Korean Patent Publication No. 10-2017-0007756 (wireless power reception apparatus and wireless communication method) discloses modulation of the amplitude of a wireless power signal depending on the measured intensity of the wireless power signal, but does not explicitly disclose a configuration for increasing the recognition rate of the already distorted ASK signal.

SUMMARY OF THE INVENTION

Therefore, the present disclosure has been made in view of the above problems, and it is an object of the present disclosure to provide a method and apparatus for determining an amplitude-shift keying (ASK) signal, and a wireless power transmitter using the same for smoothly performing short-range wireless communication.

In accordance with an aspect of the present disclosure, the above and other objects can be accomplished by the provision of a method of determining data of an ASK signal, the method including receiving a demodulated signal of a received ASK signal, measuring a pulse time during which a pulse configuring the demodulated signal is held, storing the measured pulse time, and determining information on a current pulse based on a pulse time of the current pulse of the demodulated signal and a holding time of an immediately preceding pulse.

The determining may include determining whether a data value of the current pulse is 0 or 1 by determining whether a value, obtained by summing a pulse time of a previous pulse and a pulse time of the current pulse and then subtracting a pulse time of a pulse configuring 0 or 1 of a reference pulse of the ASK signal from a summed value, is closer to the pulse time of a pulse configuring 0 or 1 of the reference pulse.

In accordance with another aspect of the present disclosure, there is provided an apparatus for determining data of an ASK signal, the apparatus including a pulse time measurer configured to receive a demodulated signal of a predetermined received ASK signal and to measure a pulse time during which a pulse configuring the demodulated signal is held, a pulse time storage configured to receive the measured pulse time from the pulse time measurer and to store the pulse time, and a pulse information determiner configured to receive a pulse time of a current pulse from the pulse time measurer, to receive a pulse time of an immediately preceding pulse from the pulse time storage, and to determine whether data of the current pulse is 0 or 1 based on the received pulse time.

The pulse information determiner may determine whether a data value of the current pulse is 0 or 1 by determining whether a value, obtained by summing a pulse time of a previous pulse and a pulse time of the current pulse and then subtracting a pulse time of a pulse configuring 0 or 1 of a reference pulse of the ASK signal from a summed value, is closer to the pulse time of a pulse configuring 0 or 1 of the reference pulse.

The data determining apparatus of the ASK signal according to the present disclosure may be applied to a wireless power transmitter.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

Reference will now be made in detail to the exemplary embodiments of the present disclosure with reference to the accompanying drawings. In the following description of the present disclosure, a detailed description of known functions and configurations incorporated herein will be omitted when it may make the subject matter of the present disclosure unclear. The terms used in the specification are defined in consideration of functions used in the present disclosure, and can be changed according to the intent or conventionally used methods of users or operators. Accordingly, definitions of the terms should be understood on the basis of the entire description of the present specification.

Figure 1:
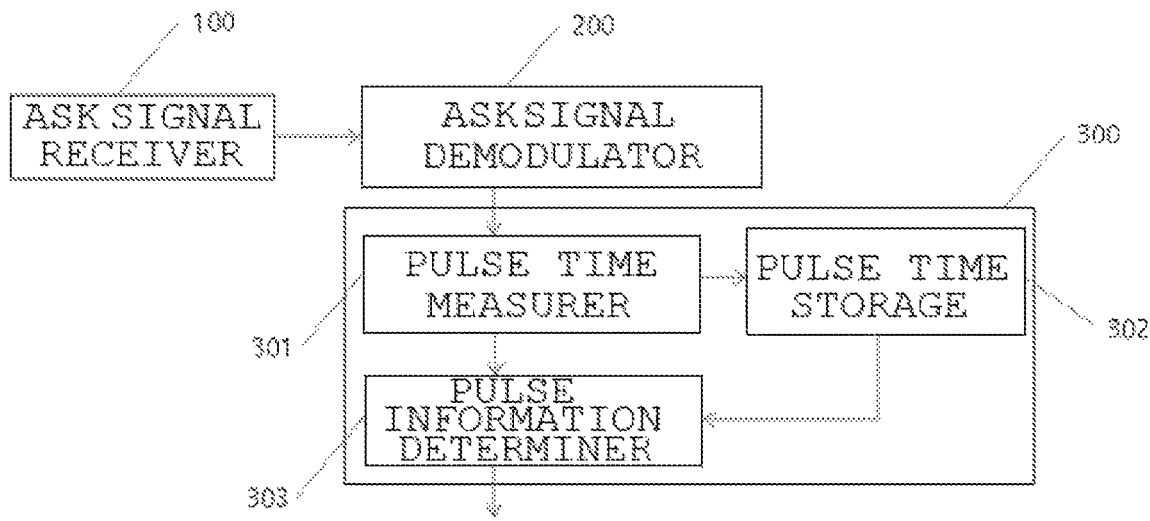
FIG. 1 is a block diagram showing the configuration of a data determining apparatus of an amplitude-shift keying (ASK) signal according to the present disclosure.

FIG. 1 is a block diagram showing the configuration of a data determining apparatus of an amplitude-shift keying (ASK) signal according to the present disclosure. An ASK signal receiver 100 may perform a function of receiving a predetermined ASK signal. An ASK signal demodulator 200 may perform a function of demodulating the ASK signal using a general method.

The ASK signal receiver 100 and the ASK signal demodulator 200 may be positioned on a predetermined wireless power transmitter for wireless power transmitter.

The data determining apparatus 300 of the ASK signal may include a pulse time measurer 301, a pulse time storage 302, and a pulse information determiner 303.

The pulse time measurer 301 may receive a demodulated signal, which is demodulated, from the ASK signal demodulator 200, and may sequentially measure a pulse time, which is the holding time of the pulse of the demodulated signal.

The pulse time storage 302 may receive the measured pulse time from the pulse time measurer 301 and may store the pulse time.

The pulse information determiner 303 may receive a pulse time of a pulse, which is currently received from the pulse time measurer 301, may receive a pulse time of an immediately preceding pulse from the pulse time storage 302, and may determine data of the current pulse based on the received information.

Here, in a method of determining data of a pulse, a pulse time of a current pulse and a pulse time of an immediately preceding pulse may be summed to obtain a summed value, a pulse time of a reference pulse (which is a pulse of an ASK signal without distortion) corresponding to data of an immediately preceding pulse based on a pulse time of a reference pulse of an ASK signal without distortion may be subtracted from the summed value to obtain a result value, and the result value and the pulse time of the reference pulse may be compared to determine the data.

Figure 2:
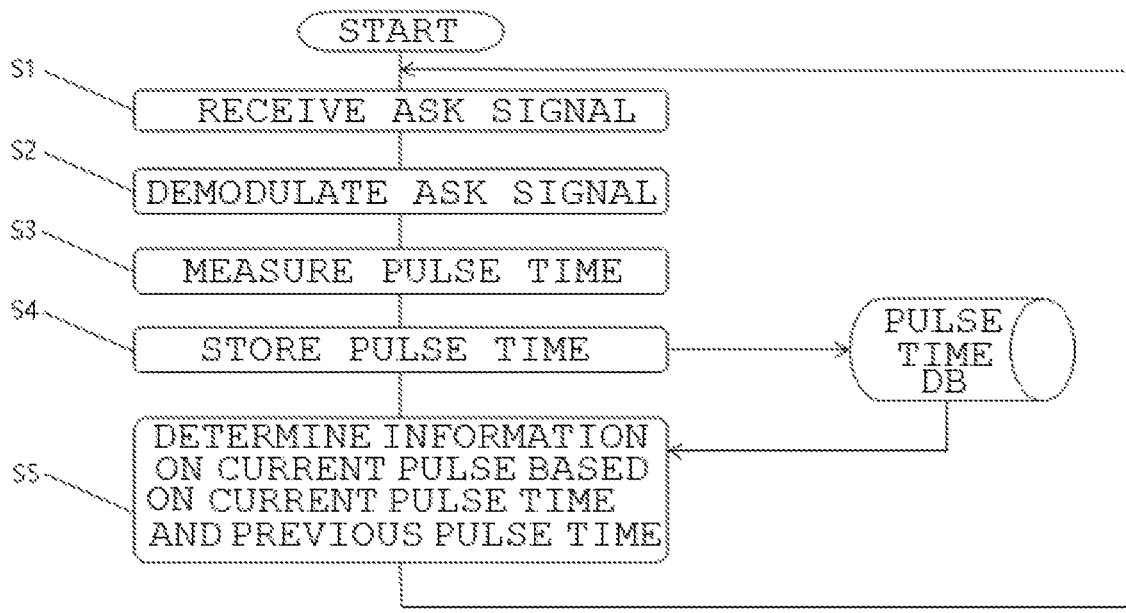
FIG. 2 is a flowchart of a method of determining data of an ASK signal according to the present disclosure.

FIG. 2 is a flowchart of a method of determining data of an ASK signal according to the present disclosure.

First, when the ASK signal is received (S1), the ASK signal may be demodulated (S2). A pulse time, which is the holding time of a pulse of the demodulated signal, may be measured (S3), and the measured pulse time may be stored (S4). Then, data of a current pulse may be determined based on the pulse time of a newly measured current pulse and the pulse time of an immediately preceding pulse, which are previously stored in operation S4 (S5).

Here, the method of determining the data of the current pulse is the same as the above description.

Figure 3:
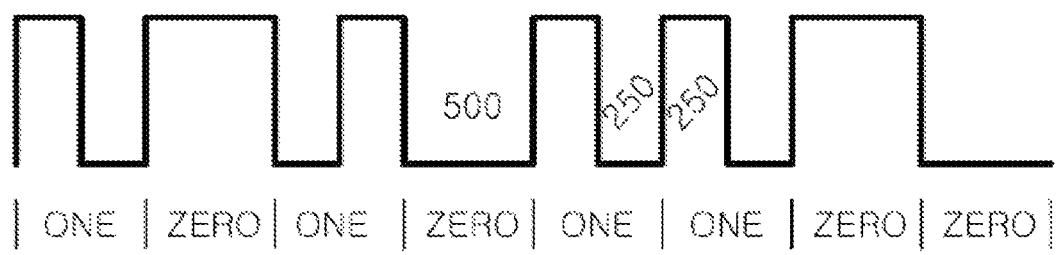
FIG. 3 shows data of an ASK signal without distortion according to an embodiment.

FIG. 3 shows data of an ASK signal without distortion according to an embodiment. As such, a demodulated signal of an ASK signal without distortion may be configured with a pulse that regularly corresponds to data of 0 or 1 and has a predetermined holding time. A pulse time of a reference pulse shown in FIG. 3 may be 500 µS in the case of 0 and may be 250 µS in the case of 1. In this case, when the holding time of a pulse of the received ASK signal is within a range of 150 µS to 350 µS, the holding time may be recognized to be 250 µS and corresponding data may be determined to be data of 1, and when the holding time is within a range of 400 µS to 600 µS, the holding time may be recognized to be 500 µS and the corresponding data may be determined to be data of 0. However, when the holding time of a pulse of the received ASK signal is within the range of 350 µS to 400 µS, it may be difficult to determine whether the corresponding data to be 0 or 1.

Figure 4:
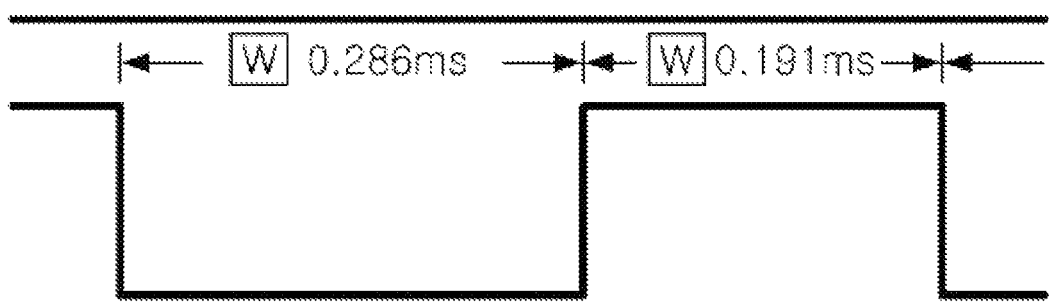
FIG. 4 shows data determination when distortion is caused in an ASK signal according to an embodiment of the present disclosure.

FIG. 4 shows data determination when distortion is caused in an ASK signal according to an embodiment of the present disclosure, shows an example of a demodulated signal that is received and demodulated after the ASK signal of FIG. 3 is distorted for various reasons, and shows the case in which data of the ASK signal is determined according to the present disclosure.

First, referring to FIG. 4, the holding time of an immediately preceding pulse may be 286 µS, and the pulse time of the current pulse may be 192 µS.

In this case, the pulse time of the immediately preceding pulse and the pulse time of the current pulse may be summed to obtain 478 µS, and the data value of the immediately preceding pulse may be 1, and thus, 250 µS as a holding time of a reference pulse in the case of a data value of 1 may be subtracted from the summed value to obtain 228 µS. Here, 228 µS is closer to 250 µS, which is the holding time of the reference pulse in the case of a data value of 1, than to 500 µS, which is the holding time of the reference pulse in the case of a data value of 0, and thus the data of the current pulse may be determined to be a pulse configuring a data value of 1.

The data determining apparatus of the ASK signal according to the present disclosure may be applied to a wireless power transmitter. That is, when a wireless power transmitter and a wireless power receiver (a smart phone or the like) are positioned far from each other, even if a signal transferred from the wireless power receiver is distorted, the wireless power transmitter to which the present disclosure is applied may extract data from the distorted signal normally and may perform communication.

According to the present disclosure, even if an ASK signal is distorted for various reasons, for example, when a transmitter and a receiver of the ASK signal are positioned far from each other or when other obstacles are present between the transmitter and the receiver, the recognition rate of the ASK signal may be increased, thereby achieving smooth communication. In particular, in the case of a wireless power transmitter, even if an ASK signal transmitted from the wireless power receiver is distorted when the wireless power transmitter is positioned far from a wireless power receiver (a smart phone or the like) or an obstacle is present, the present disclosure may be applied to smoothly perform communication between the wireless power transmitter and receiver.

The embodiments of the present disclosure may be embodied as computer readable code stored on a computer readable recording medium.

Code and code segments constituting the computer program may be easily understood by those skilled in the art to which the present disclosure pertains. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

Although the embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method of determining data of an amplitude-shift keying (ASK) signal, the method comprising:
receiving a demodulated signal of a received ASK signal;

measuring a pulse time during which a pulse configuring the demodulated signal is held;

storing the measured pulse time; and determining information on a current pulse based on a pulse time of the current pulse of the demodulated signal and a holding time of an immediately preceding pulse, wherein the determining includes determining whether a data value of the current pulse is 0 or 1 by determining whether a value, obtained by summing a pulse time of a previous pulse and a pulse time of the current pulse and then subtracting a pulse time of a pulse configuring 0 or 1 of a reference pulse of the ASK signal from a summed value, is closer to the pulse time of a pulse configuring 0 or 1 of the reference pulse.

2. A non-transitory computer readable recording medium having recorded thereon a program for executing the method of claim 1.

3. An apparatus for determining data of an amplitude-shift keying (ASK) signal, the apparatus comprising:

a pulse time measurer configured to receive a demodulated signal of a predetermined received ASK signal and to measure a pulse time during which a pulse configuring the demodulated signal is held;

a pulse time storage configured to receive the measured pulse time from the pulse time measurer and to store the pulse time; and a pulse information determiner configured to receive a pulse time of a current pulse from the pulse time measurer, to receive a pulse time of an immediately preceding pulse from the pulse time storage, and to determine whether data of the current pulse is 0 or 1 based on the received pulse time, wherein the pulse information determiner determines whether a data value of the current pulse is 0 or 1 by determining whether a value, obtained by summing a pulse time of a previous pulse and a pulse time of the current pulse and then subtracting a pulse time of a pulse configuring 0 or 1 of a reference pulse of the ASK signal from a summed value, is closer to the pulse time of a pulse configuring 0 or 1 of the reference pulse.

4. A wireless power transmitter comprising the apparatus for determining data of the ASK signal of claim 3.

* * * * *